July 19, 1960

W. A. LUTHER, JR., ET AL 2,945,292

FRICTION MATERIAL

Filed Nov. 28, 1958

INVENTORS
William A. Luther, Jr.
Roland P. Koehring
BY

Their Attorney

July 19, 1960 W. A. LUTHER, JR., ET AL 2,945,292
FRICTION MATERIAL
Filed Nov. 28, 1958 2 Sheets-Sheet 2

INVENTORS
William A. Luther, Jr.
Roland P. Koehring
BY
Their Attorney

United States Patent Office 2,945,292
Patented July 19, 1960

2,945,292
FRICTION MATERIAL

William A. Luther, Jr., and Roland P. Koehring, Dayton, Ohio, assignors to General Motors Corporation, Detroit, Mich., a corporation of Delaware Filed Nov. 28, 1958, Ser. No. 776,978

10 Claims. (Cl. 29—182.5)

This invention relates to friction materials and is particularly concerned with ferrous friction members for use as clutches, brakes and the like.

This application is a continuation-in-part of application S.N. 684,954, filed September 19, 1957, now abandoned.

An object of the invention is to provide a ferrous friction facing consisting essentially of iron, graphite and a metallic lubricant consisting of bismuth or alloys of bismuth with metals that are substantially insoluble in iron.

In carrying out the above object, it is a further object of the invention to form the friction member from a sintered mixture of iron powder with graphite which member also contains a lubricant metal in the form of bismuth, bismuth-lead alloys, and bismuth-cadmium alloys and wherein graphite makes up a substantial portion of the member.

A still further object of the invention is to provide a ferrous friction member which consists essentially of graphite ranging between 20% and 30% by weight and a lubricating metal such as bismuth or bismuth alloys wherein the alloy has a melting point not greater than the melting point of bismuth and wherein the other metals in the alloy are substantially insoluble in iron.

In carrying out the above object, it is a further object where bismuth or a bismuth-lead alloy is used as a lubricating metal, to include small quantities of an additional metal substantially nonalloyable with the lubricating metal, one of such metals being copper.

It is a further object in some cases to utilize small quantities of sulfur not over 1% in combination with the iron either as an added ingredient or as an impurity in the iron used and/or a ceramic material such as mullite in quantities of less than 1%.

Another object of the invention is to provide the ferrous friction element as heretofore disclosed with a strong metal supporting member for facilitating the mounting of the friction element, said member taking the form of a sintered ferrous material of different composition and greater strength than the friction element and bonded coextensively thereto.

More specifically, it is an object of the invention to provide a sintered ferrous friction element consisting essentially of graphite 30 to 45 parts by weight, copper 0 to 15 parts by weight, bismuth or insoluble alloys thereof 6 to 10 parts by weight and iron 100 parts by weight.

In carrying out the above object, it is a further object to optionally include sulfur and mullite in the above formulation.

Another object of the invention is to provide a ferrous friction member containing substantial quantities of graphite together with a lubricating metal which is substantially insoluble in the metals making up the ferrous friction member, said lubricating metal having a melting point within the range of temperatures encountered during subsequent use of the friction element whereby the metallic lubricant melts and exudes to the surface of the element during use to stabilize the frictional characteristics of the element.

Further objects and advantages of the present invention will be apparent from the following description, reference being had to the accompanying drawings wherein preferred embodiments of the present invention are clearly shown.

In modern automotive development, extreme operating conditions are encountered at friction surfaces used for brakes, clutches and the like. These extreme conditions make conventional nonmetallic clutch facings and brake linings costly to use since these materials must operate below certain limiting temperatures if their efficiency is to be maintained which requires cooling media and other devices to limit the temperatures. It is, therefore, desirable to provide facing materials for clutches, brakes and the like which can withstand considerably higher temperatures than the usual nonmetallic materials and which maintain substantially constant frictional characteristics throughout their operating temperature range.

Metallic facing materials made from sintered metals such as sintered bronze, sintered iron and the like have been used sparingly in the past and, while the wear characteristics on these elements are considerably better than nonmetallic elements, it has been found difficult to control the coefficients of friction thereof through the wide range of temperatures that are encountered in normal operation whereby the build-up in friction during successive stops makes them erratic in their operation and, therefore, generally undesirable.

Recently, improved friction facings have been proposed of the metallic type wherein substantial quantities of graphite have been incorporated therein to smooth out the coefficient of friction to some extent over a wide range of temperature. These facings provide considerably better operating characteristics and are frequently entirely satisfactory under normal operating conditions. However, when heavy duty service is encountered such as, for example, with taxicabs, busses or stops from high speeds, these friction materials do not always maintain their stability within the range desired.

The present invention is directed to a friction material which has a stabilized coefficient of friction and, therefore, is extremely useful in any application such as a clutch or brake wherein stabilized friction characteristics are desired over a wide range of temperatures, whether or not the application falls in the category of a heavy duty application. We believe that this stabilization of friction characteristics is accomplished through the use of a metallic lubricant which is transitory in character at the surface of the element, that is to say, the lubricating metal is held in the solid state within the pores of the friction element at temperatures below its melting point and, when these temperatures are exceeded, this metal, due to its insolubility with the other components of the element and due to its expansion, will exude onto the surface of the element and provide a fluid lubricant which stabilizes the frictional characteristics of the element while maintaining the desired frictional characteristics thereof as provided by other components of the element.

Figure 1:
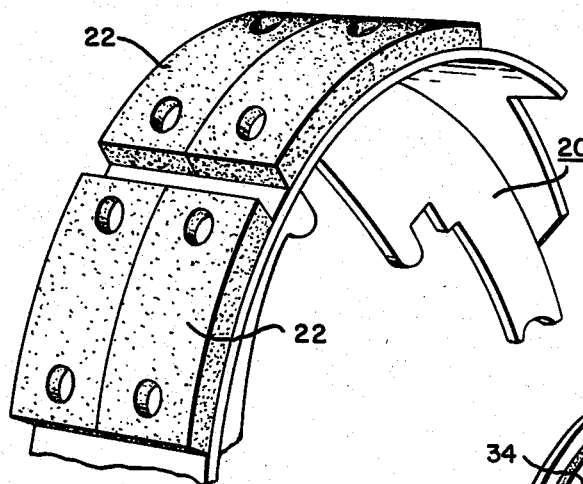
Figure 1 is a perspective view of a typical brake band including the ferrous friction element thereon.
Figure 2:
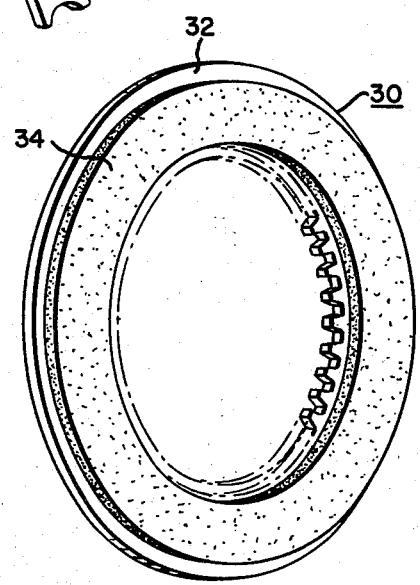
Figure 2 is a view in perspective of a conventional clutch disc utilizing the ferrous friction facing thereon.

It is understood that, in the description to follow, the ferrous friction element may be used in connection with brake bands or clutch discs or brake discs as the case may be. For example, in Figure 1, a conventional brake band is shown at 20 which includes a plurality of pads of friction material 22 attached thereto. In Figure 2, a clutch disc or brake disc is shown at 30 which includes a steel disc 32 having a friction layer 34 attached thereto.

Specifically, we have found that, in a ferrous friction element wherein the major component is iron, large quantities of graphite are highly desirable to supply the desired frictional characteristics to the element. In this connection, graphite ranging from 20% to 30% by weight of the element is incorporated in the element together with a lubricating metal such as bismuth, or alloys of bismuth with metals which are insoluble in iron and wherein the melting point of the alloy does not exceed the melting point of bismuth, for example, lead-bismuth alloys and cadmium-bismuth alloys. The low melting metal may be bismuth alone which melts at about 520° F. or it may be an alloy of bismuth and lead which melts at or below the melting point of bismuth. In this connection, an alloy of 88% lead and 12% bismuth has substantially the same melting point of bismuth whereas the eutectic alloy of lead and bismuth which contains 55½% bismuth and 44½% lead melts at about 255° F. Thus, bismuth-lead alloys where the minimum bismuth percentage is 12% may be used as a substitute for pure bismuth according to use since any alloy having this composition will melt at or below the melting point of bismuth. In this connection, the service requirements of the brake should be taken into consideration. Heavy duty applications are best served by the higher melting point alloys whereas light duty applications may make use of the lower melting point alloys. In all cases, it is desirable that the melting point of the lubricating metal is in the range of temperature attained during normal use of the friction element and these conditions therefore govern to a large degree the choice of material. Similarly, alloys of bismuth and other metals may be used wherein the other metal in the alloy is substantially insoluble in iron, for example, cadmium is insoluble in iron and alloys with bismuth to form low melting point alloys. In this connection, an alloy of 25% bismuth and 75% cadmium has substantially the same melting point of pure bismuth whereas the eutectic alloy of 60% bismuth and 40% cadmium melts at about 292° F. Stated broadly, therefore, alloys of bismuth with metals insoluble in iron wherein the alloy has a melting point not in excess of the melting point of bismuth are useful as the lubricating metal.

Thus, it will be seen that we have chosen a lubricating metal which is insoluble in the iron and which melts within a range of temperature generally reached by the friction element during use. Other insoulble metals could possibly be used but, in these cases, the melting point is sufficiently high that the liquidus state of the metal is not reached upon operation of the friction element whereby erratic results occur due to the fact that the so-called lubricating metal may be liquid in one case and solid in another.

Therefore, in each instance, the low melting point metal, which acts as a lubricating metal, melts at temperatures within the normal operating temperature range of the friction element and, in each instance, where combinations of these low melting point metals are used, the eutectic mixtures thereof melt at relatively lower temperatures to quickly stabilize the frictional characteristics of the element by presenting a liquid phase at the interface between the element and the brake drum or other rubbing surface, etc.

Some examples of suitable mixtures are as follows, all proportions being in parts by weight:

| | Ex. 1 | Ex. 2 | Ex. 3 | Ex. 4 | Ex. 5 | Ex. 6 |
|---|---|---|---|---|---|---|
| Sponge or Reduced Oxide Iron (with or without 1% combined sulfur) | 100 | 100 | 100 | 100 | 100 | 100 |
| Graphite | 30 | 45 | 30 | 45 | 45 | 30 |
| Bismuth | 6 | 6 | 6 | 6 | 6 | 10 |
| Copper | | | 9 | 9 | 15 | 15 |
| Lead | | | | 4 | 6 | |
| Mullite | .7 | | .75 | | .8 | |

These ingredients in finely divided form, for example, capable of passing through a 100 mesh screen are intimately mixed and are briquetted into the desired shape under briquetting pressures ranging from 60,000 to 80,000 pounds per square inch and are then sintered under nonoxidizing conditions for from 30 to 40 minutes at temperatuers ranging from 1800° F. to 2000° F. In each case, a sintered friction element is formed which will exude bismuth, bismuth-lead, etc., as the case may be, at the surface thereof.

More specific examples comprise:

Example 7

67 parts —250 mesh sponge iron powder (combined sulfur up to 1% by weight)
20 parts artificial graphite (density 1.85 grams per cc., —325 mesh)
8 parts 150 mesh copper powder
5 parts 100 mesh bismuth powder These ingredients are intimately mixed and are briquetted at 60,000 pounds per square inch and are then sintered at 40 minutes in a nonoxidizing atmosphere at 1800° F. The resulting friction facing has a fiber strength in the order of 3720 pounds per square inch.

Example 8

67 parts —250 mesh sponge iron powder (with 1% combined sulfur)
15 parts powdered artificial graphite (density 1.85 grams per cc., —325 mesh)
15 parts coarse flake natural graphite (density about 2.1 grams per cc., 20 to 30 mesh)
5 parts 150 mesh copper powder
10 parts 100 mesh bismuth-lead (50–50 mixture) with or without ½ part 60 mesh synthetic mullite These ingredients are intimately mixed and briquetted at 70,000 pounds per square inch and sintered for about 40 minutes in a nonoxidizing atmosphere at a temperature of about 1800° F. The resulting friction element has a fiber strength in the order of 3045 pounds per square inch.

It is understood that the lubricating metal such as bismuth-lead alloy may be introduced by impregnation if desired, although the usual technique as described heretofore are preferred. Furthermore, due to the sintering step, it is usually not necessary to pre-alloy the bismuth with any other metal to be used therewith since alloying will occur in situ during the sintering.

All of the above friction elements made by any of the aforementioned examples are preferably bonded to a more dense and stronger material during the sintering to enable them to be riveted or spot-welded to a steel shoe or plate. This particular step forms no part of the present invention and is fully disclosed in copending Smiley application, S.N. 596,266, filed July 6, 2956, assigned to the assignee of the present invention. Specifically, a backing material that is particularly useful with the present formulations, since it has similar physical change characteristics during briquetting and sintering, comprises a mixture of about 95 parts 100 mesh sponge iron powder, 5 parts low density powdered graphite (1.68 grams per cc., —325 mesh), and three parts of molybdenum disulphide powder (250 mesh). These ingredients are intimately mixed and the mixture is placed in a die in desired quantity. Any of the aforementioned friction material mixes is then filled into the die and the two layers are simultaneously briquetted at pressures of from 60,000 to 80,000 pounds per square inch. The briquette is sintered under conditions, times and temperatures noted in any of the examples. A coextensively bonded material is formed having a strong backing layer and a friction facing of the desired characteristics. As mentioned before, the application S.N. 596,266 gives a detailed disclosure of the method of making these composite friction elements and the present invention is directed solely to the friction layer and its characteristics.

Figure 4:
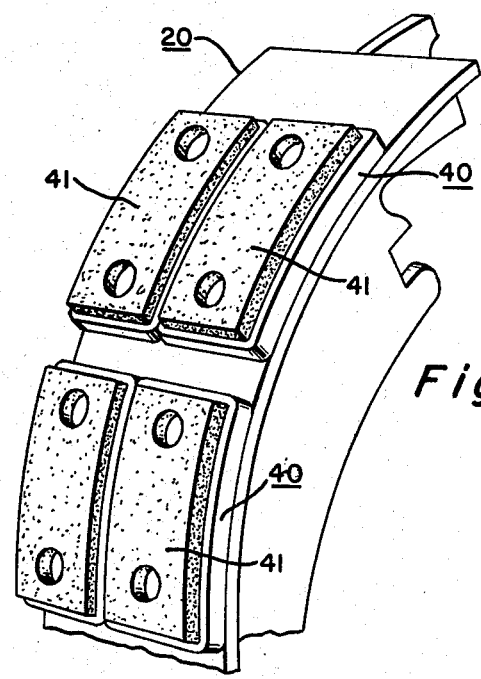
Figure 4 is a perspective view similar to Figure 1 showing another means of attaching the friction lining to the shoe.
Figure 5:
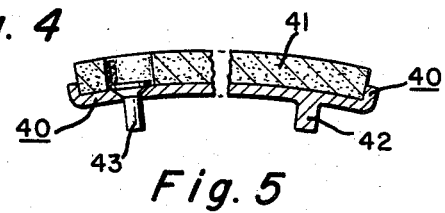
Figure 5 is a view of one segment of the friction material and its support.

In place of the composite material described, the friction layer may be supported by and bonded to a retaining device or member made of stamped or cast metal. Such a retainer is shown at 40 in Figures 4 and 5. The retainer 40 is preferably made of stamped steel and is made in the form of a shallow cup or tray which carries a friction material layer 41 therein. The retainer 40 may include fastening means 42 welded or otherwise attached thereto as shown in the right side of Figure 5 or the retainer may be riveted by means of rivets 43 or directly welded to the band 20. In the case of rivets 43 being used, the friction layer 41 is counterbored so that the heads of the rivets bear against the container. In all cases, the friction layer 41 is sintered and bonded in situ to the container 40 by briquetting the powdered material directly in the retainer. Prior to the briquetting operation, the retainer surface is preferably flash copper plated as well known in the art to facilitate the bond.

It will be observed that, when the graphite content of the friction material exceeds 25%, different manufacturing techniques are required in order to form an element having sufficient strength for the intended purpose and, to this end, different types of graphite are used to overcome problems which arise when using either type of graphite alone. These manufacturing techniques form no part of this invention and are fully disclosed in copending application, S.N. 684,853 (Docket No. MP–2712), filed September 19, 1957, wherein the full disclosure of the reasons for mixing the different types of graphite are set forth. In this connection, so far as the finished friction element is concerned, there is no substantial difference in the operational characteristics of the different types of graphite but the strength of the finished element is markedly enhanced by mixing two types of graphite.

While the friction elements utilizing graphite in the order of 20% have good frictional characteristics and under normal operating conditions function well, there is some tendency toward noisy operation under certain specific conditions. As the graphite content is increased, this noise condition decreases to a point where the element is comparable with conventional nonmetallic elements at 25% of graphite and above. In other words, as the graphite increases, the tendency toward noise decreases under all conditions.

The new friction facings described herein function well with conventional mating surfaces such as steel or cast iron which is normally used as clutch disc and brake drum material. It will also function in combination with other metals providing the lubricant metal does not alloy therewith at operating temperatures. For this reason, the metal of the mating surfaces should be chosen from metals and alloys that do not form intermetallic compounds with the low melting point metals such as lead, bismuth or cadmium used in the friction material.

Figure 3:
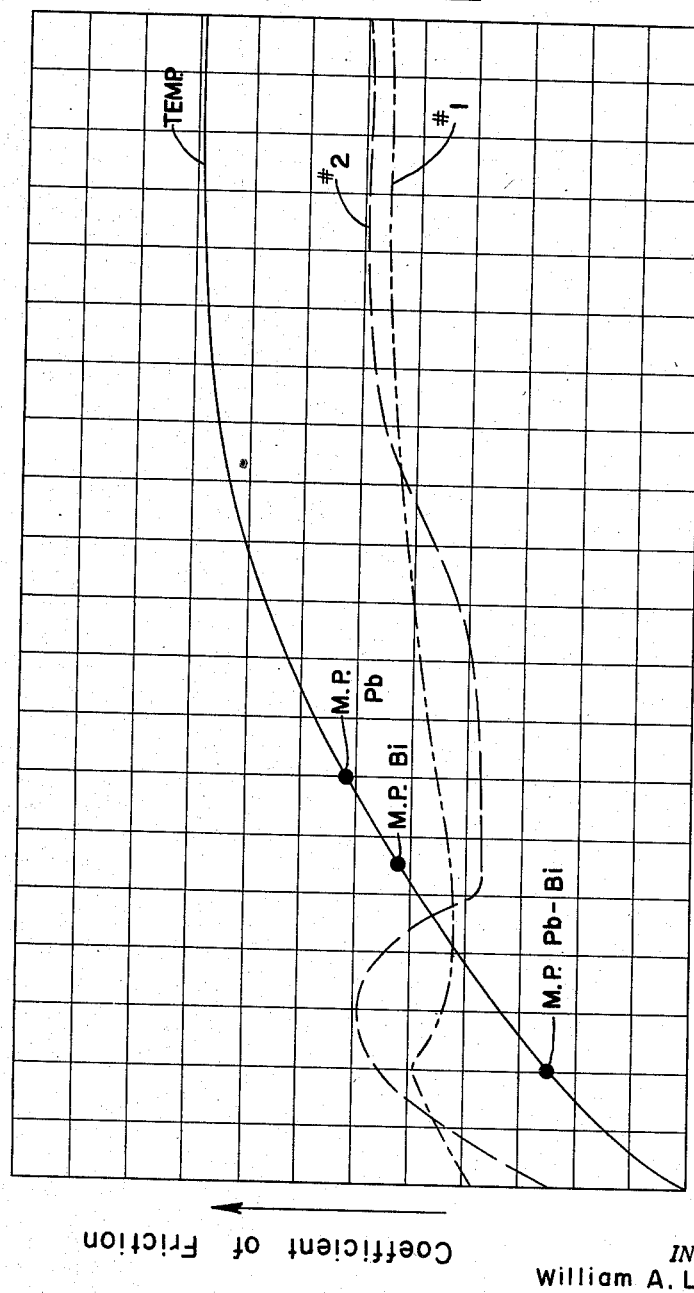
Figure 3 is a chart of a family of curves for ferrous friction materials including different metal lubricants and showing coefficient of friction plotted against time and temperature.

The curves shown in Figure 3 are for two different friction linings. Curve #1 is for the material disclosed in Example 8. Curve #2 is the material using 5% bismuth alloy instead of the bismuth-lead alloy. In each case, it will be noted that the coefficient of friction of the lining is unstable until the temperature of operation exceeds the melting point of the lubricant metal at which time the coefficient of friction levels off and becomes stabilized.

Throughout this specification, the term ceramic material is used together with mullite as one embodiment thereof. It is to be understood that this example is illustrative only and that clays, silica magnesium oxide, mica or any of the other refractory ceramic materials may be used with varying useful results.

While the embodiments of the present invention as herein disclosed constitute preferred forms, it is to be understood that other forms might be adopted.

What is claimed is as follows:

1. A friction material for use as a friction facing element, consisting essentially of: a sintered ferrous base having dispersed therethrough graphite in quantities of from 20% to 30% by weight, together with at least one metal taken from the class consisting of: bismuth, bismuth-lead and bismuth-cadmium alloys wherein the melting point of the alloys does not exceed the melting point of bismuth, said last-mentioned metal being present in quantities of from 3% to 10% by weight.

2. A friction material for use as a friction facing element, consisting essentially of: a sintered ferrous base having dispersed therethrough graphite in quantities of from 20% to 30% by weight, together with bismuth in quantities of from 3% to 10% by weight.

3. A friction material for use as a friction facing element, consisting essentially of: a sintered ferrous base having dispersed therethrough graphite in quantities of from 20% to 30% by weight, together with a bismuth-lead alloy having a melting point not exceeding the melting point of bismuth in quantities of from 3% to 10% by weight.

4. A friction material for use as a friction facing element, consisting essentially of: a sintered ferrous base having dispersed therethrough graphite in quantities of from 20% to 30% by weight, together with a metal taken from the class of bismuth and bismuth alloys with metals insoluble in iron wherein said alloys have a melting point not in excess of the melting point of bismuth in quantities of from 3% to 10% by weight.

5. A sintered friction material for use as a friction facing element, consisting essentially of: iron, including sulfur up to 1% by weight thereof, 100 parts, graphite 30 to 45 parts, copper up to 15 parts, and a metal, taken from the class consisting of bismuth and bismuth alloys with metals insoluble in iron wherein said alloys have melting points not in excess of the melting point of bismuth, 6 to 10 parts, said proportions being expressed as parts by weight.

6. A sintered friction material for use as a friction facing element, consisting essentially of: iron, including sulfur up to 1% by weight thereof, 100 parts, graphite 30 to 45 parts, copper up to 15 parts, mullite up to 1% by weight, and a metal, taken from the class consisting of bismuth and bismuth alloys with metals insoluble in iron wherein said alloys have melting points not in excess of the melting point of bismuth, 6 to 10 parts, said proportions being expressed as parts by weight.

7. A sintered friction material for use as a friction facing element, consisting essentially of: iron 100 parts, graphite 30 to 45 parts, copper up to 15 parts, and bismuth 6 to 10 parts, said proportions being expressed as parts by weight.

8. A sintered friction material for use as a friction facing element, consisting essentially of: iron 100 parts, graphite 30 to 45 parts, copper up to 15 parts, together with sulfur and mullite in quantities not in excess of 2%, and bismuth 6 to 10 parts, said proportions being expressed as parts by weight.

9. A sintered friction material for use as a friction facing element, consisting essentially of: iron 100 parts, graphite 30 to 45 parts, copper up to 15 parts, and a bismuth-lead alloy 6 to 10 parts, said proportions being expressed as parts by weight.

10. A heavy duty brake comprising a friction element, consisting essentially of: iron 67 parts, graphite 20–30 parts, a bismuth-lead alloy wherein the bismuth and lead are in equal proportions 5–10 parts, copper 8 parts, all proportions being expressed in parts by weight, said element being coextensively attached at one surface thereof to a strong metal supporting member.

References Cited in the file of this patent
UNITED STATES PATENTS

| | | |
|---|---|---|
| 2,072,070 | Fisher | Feb. 23, 1937 |
| 2,416,830 | Heuberger | Mar. 4, 1947 |
| 2,863,211 | Wellman | Dec. 9, 1958 |